(12) United States Patent
Wagner (10) Patent No.: US 9,364,698 B2
(45) Date of Patent: Jun. 14, 2016

(54) INERTING METHOD AND SYSTEM FOR REDUCING OXYGEN

(71) Applicant: Amrona AG, Zug (CH)

(72) Inventor: Ernst Werner Wagner, Winsen (DE)

(73) Assignee: AMRONA AG, Zug (CH)

( * ) Notice: Subject to any disclaimer, the term of this patent is extended or adjusted under 35 U.S.C. 154(b) by 98 days.

(21) Appl. No.: 14/266,058

(22) Filed: Apr. 30, 2014

(65) Prior Publication Data

US 2014/0326021 A1 Nov. 6, 2014

(30) Foreign Application Priority Data

May 6, 2013 (EP) .................................... 13166652

(51) Int. Cl.
*B01D 53/047* (2006.01)
*A62C 35/00* (2006.01)
*A62C 99/00* (2010.01)
*B01D 53/04* (2006.01)

(52) U.S. Cl.
CPC ............ *A62C 99/0018* (2013.01); *B01D 53/04* (2013.01); *B01D 53/047* (2013.01); *B01D 53/0476* (2013.01); *B01D 2256/10* (2013.01); *B01D 2257/104* (2013.01)

(58) Field of Classification Search
CPC .. A62C 99/0018; B01D 53/04; B01D 53/047; B01D 53/0476; B01D 2256/10; B01D 2257/104
USPC .............. 95/8, 12, 96, 115, 138; 96/111, 121; 169/11
See application file for complete search history.

(56) References Cited

U.S. PATENT DOCUMENTS

| | | | |
|---|---|---|---|
| 5,308,382 A | 5/1994 | Prasad | |
| 5,496,388 A * | 3/1996 | Tellier | B01D 53/22 96/111 |
| 7,686,870 B1 * | 3/2010 | Deane | B01D 53/0446 128/205.12 |
| 7,766,996 B2 * | 8/2010 | Celik | B01D 53/0446 95/96 |
| 2004/0112220 A1* | 6/2004 | Defrancesco | A62B 7/14 96/108 |
| 2008/0135265 A1* | 6/2008 | Wagner | A62C 99/0018 169/45 |
| 2008/0156506 A1* | 7/2008 | Wagner | A62C 99/0018 169/11 |
| 2009/0038810 A1* | 2/2009 | Wagner | A62C 99/0018 169/45 |
| 2009/0038811 A1* | 2/2009 | Wagner | A62C 99/0018 169/46 |
| 2010/0077921 A1* | 4/2010 | Haggerty | B01D 53/047 95/101 |
| 2010/0242734 A1* | 9/2010 | Maeda | A61M 16/10 96/110 |
| 2012/0222873 A1* | 9/2012 | Kotliar | B64D 37/32 169/45 |

FOREIGN PATENT DOCUMENTS

| | | |
|---|---|---|
| DE | 198 11 851 | 9/1999 |
| DE | 103 43 342 | 2/2005 |
| EP | 0 163 242 | 12/1985 |

(Continued)

*Primary Examiner* — Frank Lawrence
(74) *Attorney, Agent, or Firm* — Cesari and McKenna, LLP (57) ABSTRACT

The invention relates to an inerting system as well as an inerting method for reducing oxygen in which an oxygen content which is predefinable and reduced in comparison to normal ambient air is set and maintained in the spatial atmosphere of an enclosed room (2). To this end, the inerting system (1) comprises a compressor system (3) for compressing an initial gas mixture as well as a gas separation system (10) connected to the compressor system (3). At least a portion of the oxygen contained within the compressed initial gas mixture is separated in the gas separation system (10). The gas separation system (10) is designed to be selectively operated in either a VPSA mode or a PSA mode.

20 Claims, 5 Drawing Sheets

(56) References Cited

FOREIGN PATENT DOCUMENTS

| GB | 2 374 007 | 10/2002 |
| JP | H10 263109 | 10/1998 |
| WO | WO 2012/076721 | 6/2012 |

* cited by examiner

INERTING METHOD AND SYSTEM FOR REDUCING OXYGEN

CROSS-REFERENCE TO RELATED APPLICATIONS

The present application claims the benefit of the following commonly assigned European Patent Application Serial No. EP 13 166 652.1, which was filed on May 6, 2013 and is hereby incorporated by reference.

BACKGROUND

1. Field of the Invention

The present invention relates to an inerting method in which an oxygen content which is predefinable and reduced in comparison to normal ambient air is set and maintained in the spatial atmosphere of an enclosed room and in which the oxygen content in the enclosed room's spatial atmosphere can be quickly reduced further when the need arises.

The invention further relates to a corresponding system for reducing oxygen.

The inventive inerting method or the inventive inerting system respectively serves for example in minimizing risk and in extinguishing fires in a protected room subject to monitoring, whereby the enclosed room is continuously rendered inert to different lowered levels for the purpose of preventing or controlling fire.

2. Background Information

Among the examples of use for the inventive inerting method include providing hypoxic training conditions in an enclosed room in which the oxygen content has been reduced. Such a room enables training under artificially simulated high-altitude conditions, also referred to as "normobaric hypoxic training." Another example of use is the storing of food, preferentially pomaceous fruit, in a controlled atmosphere (CA) in which the proportional percentage of atmospheric oxygen is regulated in order to, among other things, slow the aging process acting on the perishable merchandise.

The basic principle behind inerting technology to prevent fires is based on the knowledge that in enclosed rooms which are only entered occasionally by humans or animals, and in which the equipment housed therein reacts sensitively to the effects of water, the risk of fire can be countered by reducing the oxygen concentration in the relevant area to an average value of e.g. approximately 15% by volume. At such a (reduced) oxygen concentration, most combustible materials can no longer ignite. Accordingly, the main areas of application for inerting technology in preventing fires also include IT areas, electrical switching and distribution rooms, enclosed facilities as well as storage areas containing high-value commercial goods. The preventative effect resulting from this method is based on the principle of oxygen displacement. As is known, normal ambient air consists of 21% oxygen by volume, 78% nitrogen by volume and 1% by volume of other gases. For fire prevention purposes, the oxygen content of the spatial atmosphere within the enclosed room is decreased by introducing an oxygen-displacing gas, for example nitrogen. A preventative effect is known to begin as soon as the percentage of oxygen drops below about 15% by volume. Depending upon the flammable substances stored in the protected room, it may be necessary to further lower the percentage of oxygen to, for example, 12% by volume.

This type of inerting system is known in principle in the prior art. For example, the published DE 198 11 851 A1 document describes an inerting system designed to lower the oxygen content in an enclosed room (hereinafter also referred to as "protected room") to a specific base inerting level and, in the event of a fire, to quickly lower the oxygen content further to a specific full inerting level.

The term "base inerting level" as used herein is to be understood as referring to a reduced oxygen content compared to the oxygen content of the normal ambient air, however whereby this reduced oxygen content poses no danger of any kind to persons or animals such that they can still enter into the protected room without any problem (i.e. without any special protective measures such as oxygen masks, for example). The base inerting level corresponds to an oxygen content within the protected room of e.g. approximately 15% to 17% by volume.

On the other hand, the term "full inerting level" is to be understood as referring to an oxygen content which has been further reduced compared to the oxygen content of the base inerting level such that the flammability of most materials has already been decreased to a level at which that they are no longer able to ignite. Depending upon the fire load inside the respective protected room, the full inerting level generally ranges from 12% to 14% of oxygen concentration by volume.

In the multi-stage inerting method known from the DE 198 11 851 A1 printed publication, in which the oxygen content is progressively lowered, an inerting technology for preventing fires is thus employed with which the oxygen content in the protected room is first reduced to a specific lowered level (base inerting level) of e.g. 17% by volume, whereby in the event of a fire or when otherwise needed, the oxygen content is then further reduced to a specific full inerting level of e.g. 13.8% by volume or less. If an inert gas generator, for example a nitrogen generator, is used as the inert gas source in such a two-stage inerting method for reducing the oxygen content to the first lowered level (base inerting level), the number of high-pressure gas tanks needed for full inertization, in which the oxygen-displacing gas or gas mixture (hereinafter also referred to simply as "inert gas") is stored in compressed form, can be kept low.

However, relatively high capital investments are required in order to realize the above-described and known per se two-stage inerting method since the two-stage inerting method places specific demands on the inert gas sources needed to supply the inert gas. Specifically, conventional two-stage inerting systems provide without exception for two separate inert gas sources since a distinction must be made when setting a specific inerting level (lowered level) as to whether a base inerting level or a full inerting level is to be set in the atmosphere of the room. It hereby needs to be considered that—starting from a previously set base inerting level—the lowering to a full inerting level needs to occur according to a predefined sequence of events and particularly within a predefined period of time after an alarm has been issued. In contrast, it is not necessary for the base inerting level to be set according to a predefined inerting curve.

To be understood by the term "inerting curve" as used herein is the temporal gradient of the oxygen content when oxygen-displacing gas (inert gas) is introduced into the spatial atmosphere of the protected room.

Because a distinction must be made when setting a specific inerting level as to whether a base inerting level or a full inerting level is to be set in the atmosphere of the room, the inert gas sources needed to supply the corresponding inert gas for setting the base/full inerting level are subject to different requirements. In the case of lowering to the full inerting level, the inert gas sources employed must allow for being able to provide an accordingly large enough amount of inert gas per unit of time so as to be able to set the full inerting level in the protected room's spatial atmosphere within the predefined period of time. Accordingly, the inert gas source employed for lowering to the full inerting level must have the appropriate capacity.

The inert gas source is however not subject to this requirement if only the base inerting level is to be set. As explained above, it is hereby normally not necessary to follow a predefined inerting curve and particularly adhere to a predefined period of time when lowering to the base inerting level. Accordingly, the inert gas source used to lower to a base inerting level can be of correspondingly smaller dimensions in terms of its output capacity.

For these reasons, in practical application of the two-stage inerting method, two separate inert gas sources are usually used: a nitrogen generator only able to supply a relatively small amount of inert gas (here: nitrogen-enriched air) per unit of time and used to set and maintain a base inerting level; and a high-pressure gas storage tank in which an oxygen-displacing gas or gas mixture is stored in compressed form for the purpose of being able to quickly set a full inerting level in the spatial atmosphere of the enclosed room when needed.

The use of two separate inert gas sources to realize the two-stage inerting method is coupled with the disadvantage of relatively high initial capital costs. In addition, the space that needs to be provided for storing the two separate insert gas sources (nitrogen generator on the one hand and high-pressure gas storage tank on the other) cannot be realized in some applications without undertaking major structural measures.

SUMMARY

Based on this problem as set forth, the present invention addresses the objective of specifying an inerting method or an inerting system respectively with which the running operational costs and the initial investments can be reduced in comparison to conventional solutions without thereby effecting the efficiency of the system.

This objective is accomplished by the subject matter of the claims.

The invention accordingly in particular proposes a system for reducing oxygen with which an oxygen content which is predefinable and reduced in comparison to normal ambient air is set and maintained in the spatial atmosphere of an enclosed room. The system comprises a compressor system for compressing an initial gas mixture and a gas separation system connected to the compressor system in which at least part of the oxygen within the compressed initial gas mixture is separated. The gas separation system is designed to be operated in either VPSA mode or PSA mode.

As used herein, the term "initial gas mixture" refers in general to a mixture of gas which, in addition to containing oxygen, particularly also comprises nitrogen and further gases as applicable such as noble gases, for example. Normal ambient air is for example feasible as an initial gas mixture; i.e. a mixture of gas consisting of 21% oxygen by volume, 78% nitrogen by volume and 1% by volume of other gases. It is however also conceivable to use a portion of the enclosed room's air as the initial gas mixture, whereby fresh air is preferably added to this room air content.

To be generally understood by a gas separation system operating in VPSA mode is a system for providing nitrogen-enriched air which functions according to the principle of Vacuum Pressure Swing Adsorption (VPSA). Such a VPSA system is used as the gas separation system in the inerting system according to the invention, although it can also be operated in PSA mode when needed. "PSA" is an abbreviation for "Pressure Swing Adsorption," normally denoting pressure swing adsorption technology.

In order to be able to switch the operating mode of the gas separation system used in the inventive solution from VPSA to PSA, the inventive method provides for accordingly increasing the degree to which the initial gas mixture is compressed by the compressor system. With respect to the inventive inerting method, it is specifically provided to initially provide an initial gas mixture comprising oxygen, nitrogen and other elements as applicable. The initial gas mixture as provided is subsequently appropriately compressed in a compressor system and then fed to the gas separation system in which at least a portion of the oxygen contained in the compressed initial gas mixture is separated such that a nitrogen-enriched gas mixture is provided at the outlet of the gas separation system. Said nitrogen-enriched gas mixture furnished at the outlet of the gas separation system is thereafter introduced into the spatial atmosphere of the enclosed room so as to set and/or maintain an oxygen content in the spatial atmosphere of the enclosed room which is predefinable and has a reduced oxygen content compared to normal ambient air.

According to the invention, it is in particular provided to increase the degree of compressing by the compressor system when the amount of nitrogen-enriched gas mixture provided per unit of time at the outlet of the gas separation system needs to be increased, particularly to a value dependent on the amount of nitrogen-enriched gas mixture provided per unit of time. In so doing, the operating mode of the gas separation system can be changed in such a way that the volume of nitrogen-enriched gas mixture actually provided at the outlet of the gas separation system per unit of time corresponds to the amount of nitrogen-enriched gas mixture to be supplied per unit of time.

Increasing the compressor system's compression of the initial gas mixture occurs particularly in the event of a fire; i.e. when for example a fire characteristic is detected in the spatial atmosphere of the enclosed room or when the oxygen content in the spatial atmosphere of the enclosed room is to be quickly reduced further compared to the previously set or maintained oxygen content for another reason.

A further aspect of the present invention provides for the degree of initial gas mixture compression by the compressor system to be increased when the amount of nitrogen-enriched gas mixture provided per unit of time at the outlet of the gas separation system needs to be increased due to increased air exchange. According to a further aspect of the present invention, the degree of the initial gas mixture compression by the compressor system is increased if, due to a loss of a further insert gas source allocated to the enclosed room, particularly a loss of a further gas separation system allocated to the enclosed room, the amount of the nitrogen-enriched gas mixture to be provided at the outlet of the separation system per unit of time needs to be increased.

Particularly in the event of a fire or when for another reason the oxygen content in the enclosed room's spatial atmosphere needs to be quickly further reduced, the degree to which the compressor system compresses the initial gas mixture is increased to a value which is dependent on the amount of nitrogen-enriched gas mixture to be provided per unit of time. In conjunction hereto, it is conceivable in one exemplary embodiment to increase the degree of compressing from its original 1.5 to 2.0 bar to 7.0 to 9.0 bar. In other embodiments, an increase in compression of up to 25.0 bar is conceivable. The invention is in particular not limited to the example values stated above.

The inventive solution is based on the knowledge that a gas separation system operated in PSA operating mode can provide a sufficiently high enough amount of nitrogen-enriched gas per unit of time in order to be able to realize a lowering of the oxygen content in the enclosed room from a previously set base inerting level to a full inerting level within the shortest possible time when needed. On the other hand, when the gas separation system is operated in VPSA mode, there is a considerably lower amount of nitrogen-enriched gas provided at the outlet of the gas separation system per unit of time than when the gas separation system is running in PSA mode. However, the amount of nitrogen-enriched gas able to be provided at the outlet of the gas separation system per unit of time in VPSA mode is in principle sufficient to be able to set or respectively maintain the base inerting level in the enclosed room.

The gas separation system used in the inventive solution thus fulfills a dual function: when the gas separation system is operated in VPSA mode, this system is then accorded the function of the first inert gas source used in conventional systems for providing the inert gas needed to set and/or maintain a base inerting level. In PSA operating mode, however, the output capacity of the gas separation system corresponds to that of a high-pressure gas storage tank as used in conventional two-stage inerting systems as the second inert gas source for providing the inert gas needed to produce the full inerting level.

In order to be able to selectively increase the degree of compression effected by the compressor system on the initial gas mixture, it is conceivable for the com-pressor system to comprise a first compressor and at least one second compressor, wherein the second compressor is selectively connected to the first compressor so as to increase the total achievable compression. It is particularly conceivable in this context for the first compressor and the second compressor to be inde-pen-dently controllable, wherein the first compressor is connected in series to the second compressor such that activation of the second compressor increases the degree of compression of the initial gas mixture. However, other embodiments of selectively increasing the degree of compression are of course also conceivable.

Embodiments of the inventive inerting method provide for preferably progressively increasing the degree of compression effected by the compressor system when needed until the amount of nitrogen-enriched gas mixture provided at the outlet of the gas separation system per unit of time corresponds to the amount of nitrogen-enriched gas mixture supplied per unit of time. Such an embodiment thus provides for a regulating which ensures that the gas separation system will at all times supply exactly the amount of nitrogen-enriched gas mixture as is actually needed.

According to one aspect of the present invention, it is provided for the compressor system to be designed so as to compress the initial gas mixture supplied to different, preferably predefined or predefinable pressure ranges as needed. It is hereby of advantage for the initial gas mixture to be compressed preferably automatically, and even more preferably, selectively automatically, to one of the predefined or pre-definable pressure ranges as a function of the reason and/or the cause of the needed increase in the nitrogen-enriched gas mixture to be supplied per unit of time at the outlet of the gas separation system.

The inventive solution has a number of advantages compared to the conventional two-stage inerting systems known from the prior art. Because only one single inert gas source designed as a gas separation system able to switch operating modes is used to set/maintain both a base inerting level as well as set/maintain a full inerting level, the initial investment costs for the inerting system are clearly reduced compared to the conventional solutions since there is no longer a need to provide two separate inert gas sources. The required space is also reduced for the same reasons since, from a system engineering perspective, only a compressor system and a gas separation system need to be provided to supply the nitrogen-enriched gas mixture according to the inventive solution.

On the other hand, the solution according to the invention is in particular also characterized by the fact of the gas separation system able to switch operating modes being particularly energy efficient and thus economical in terms of the running costs. The gas separation system is easy to install, particularly even in very tight spaces, and functions reliably, automatically and without on-site monitoring, which makes the inventive solution particularly user-friendly. The energy efficiency is rooted in the gas separation system operating highly efficiently with only low energy costs in VPSA mode since the compressor system only needs to provide a relatively low degree of compression. Only in an exceptional case, in particular in case of fire or when for another reason the oxygen content in the enclosed room's spatial atmosphere needs to be rapidly lowered further from the preset and maintained base inerting level to a full inerting level is a switch made from the energy-efficient VPSA operating mode to the PSA operating mode in which the output of the gas separation system is significantly increased compared to the VPSA mode.

To supply the initial gas mixture, one preferred realization of the inventive solution provides for extracting a portion of the enclosed room's air in regulated fashion, wherein fresh air is supplied to said extracted portion of the room's air, likewise in preferably regulated manner. It is preferential to this end for a mixing chamber to be provided upstream of the compressor system, wherein the fresh air is added to the extracted portion of the room air within said mixing chamber. The fresh air is thereby preferably fed to the extracted portion of the room's air in regulated manner.

In the present context, "in regulated manner" means that only that much fresh air is fed to the extracted portion of the room's air within the mixing chamber so that the amount of nitrogen-enriched gas provided at the outlet of the gas separation system per unit of time will preferably correlate to the amount of room air extracted from the enclosed room per unit of time. Doing so can thus achieve a constant pressure within the enclosed room and in particular no losses developing due to leakages or to too much nitrogen-enriched gas being supplied at the outlet of the gas separation system and fed into the room respectively, which would be disadvantageous in terms of the energy efficiency.

In technically realizing the gas separation system used in the inventive solution, it is conceivable for a separation material to be applied to the outer surfaces of hollow fiber membranes, through which water vapor and oxygen can very easily diffuse whereas nitrogen only has a low diffusion rate relative this separation material. When the initial gas mixture passes through the interior of the hollow fibers prepared as such, water vapor and oxygen diffuse outwardly through the hollow fiber wall very rapidly while the nitrogen is largely trapped within the fiber's interior such that a high concentrating of nitrogen occurs during said passing through the hollow fiber. The effectiveness of this separation process is substantially dependent upon the flow rate through the fiber and the pressure difference across the hollow fiber wall.

Different embodiments are conceivable with respect to the gas separation system used in the inventive solution. In one particularly simple realization, the gas separation system is designed as a so-called single-bed system, in which the gas separation system comprises one single adsorber vessel containing adsorbent material. The adsorber material (occasionally also called "adsorbent bed") is preferably a synthetic zeolite or a carbon molecular sieve. This thereby capitalizes on the general knowledge that different gases diffuse through materials at different speeds. In the currently proposed gas separation system, the different diffusion rates of the initial gas mixture's main elements; i.e. nitrogen, oxygen and water vapor as applicable, are in particular technically used to produce the nitrogen-enriched gas mixture.

In technically realizing the gas separation system used in the inventive solution, it is conceivable for a separation material to be applied to the outer surfaces of hollow fiber membranes, through which water vapor and oxygen can very easily diffuse whereas nitrogen only has a low one diffusion rate relative this separation material. When the initial gas mixture passes through the interior of the hollow fibers prepared as such, water vapor and oxygen diffuse outwardly through the hollow fiber wall very rapidly while the nitrogen is largely trapped within the fiber's interior such that a high concentrating of nitrogen occurs during said passing through the hollow fiber. The effectiveness of this separation process is substantially dependent upon the flow rate through the fiber and the pressure difference across the hollow fiber wall.

As previously noted, one simple realization of the inventive solution provides for the gas separation system to be designed as a single-bed system, whereby the compressor system can be connected to the inlet of the (sole) adsorber vessel so as to supply the compressed initial gas mixture to the adsorber vessel in an adsorption phase of said adsorber vessel such that the adsorber material adsorbs the oxygen from the initial gas mixture and the nitrogen-enriched gas mixture which is subsequently supplied to the enclosed room is provided at an outlet of the adsorber vessel. In this case, the adsorber material can be regenerated by lowering the pressure to the ambient pressure so that the oxygen previously bound in the adsorber material will release to the external atmosphere. Since no nitrogen-enriched air will be provided at the outlet of the gas separation system during regeneration; i.e. during the desorption cycle of the adsorber material, it is advantageous for a low-pressure surge tank to be additionally provided when the gas separation system is configured as a single-bed system, same allowing a continuous supply of nitrogen-enriched gas to the enclosed room.

Alternatively hereto, it is however also conceivable to use negative pressure to regenerate the adsorber material in the case of the gas separation system configured as a single-bed system. In this case, a vacuum cycle is employed for regenerating, in which a source of compressed air is connected to the outlet of the adsorber vessel in order to purge at least part of the oxygen previously adsorbed by the adsorber material via the inlet of the adsorber vessel for regeneration purposes and, by so doing, regenerate the adsorber material.

In order to be able to have the enclosed room be continually supplied with the nitrogen-enriched gas (inert gas) without a low-pressure surge tank, an alternative embodiment of the inventive solution provides for the gas separation system to be designed as a dual-bed system. In this case, the gas separation system comprises a first and a second adsorber vessel, each provided with an adsorbent bed or adsorber material respectively. At least during the normal operation of the inerting system; i.e. particularly when no fire has broken out in the enclosed room, the two adsorber vessels preferably operate in phase opposition such that one of the two adsorber vessels is in adsorption phase during which the adsorber material of the respective adsorber vessel adsorbs at least part of the oxygen from the supplied initial gas mixture. The other of the two adsorber vessels is thereby in regeneration phase during which the adsorber material of the other adsorber vessel is regenerated. Due to the consecutively alternating process steps, one of the two adsorber vessels is always adsorbing oxygen while the other is purged by desorption. Nitrogen-enriched gas at virtually constant pressure and of virtually constant purity is thereby continuously available at the outlet of the gas separation system.

As stated above, normally operating the gas separation system in VPSA mode is advantageous with respect to energy efficiency and to the lowest possible running operating costs, whereby the gas separation system is only to be operated in PSA mode in the event of a fire or when for another reason the oxygen content in the spatial atmosphere of the enclosed room is to be rapidly further reduced compared to the preset or maintained oxygen content.

It is hereby in particular conceivable that in VPSA operating mode, the gas separation system controls the compressor system such that the initial gas mixture is compressed to an atmospheric positive pressure of 1.5 to 2.0 bar. According to the VPSA principle, gas separation is possible at relatively low atmospheric positive pressure. In this case, an adsorption cycle and a desorption cycle is preferably used when the gas separation system is designed as a dual-bed system, wherein the two adsorber vessels are alternatingly operated in adsorption and desorption cycle by means of pressure swing technology between atmospheric positive pressure of 1.5 to 2.0 bar and atmospheric negative pressure (vacuum) of approximately 0.2 to 0.85 bar.

In order to be able to quickly increase the amount of nitrogen-enriched gas provided per unit of time at the outlet of the gas separation system in the event of a fire or for another reason, the gas separation system is switched from VPSA operating mode into PSA operating mode, and done so by providing the initial gas mixture at the outlet of the gas separation system at an atmospheric positive pressure of 7.0 to 9.0 bar.

However, it is of course also conceivable for one of the two adsorber vessels to be operating in desorption cycle while the other of the two adsorber vessels is concurrently operating in adsorption cycle also when the gas separation system is in PSA operating mode.

In order to optimize the efficiency of the gas separation system, it is advantageous for the gas separation system to moderate the temperature of the initial gas mix-ture to 10° C. to 30° C. and more preferentially to 15° C. to 25° C. In order to realize particularly energy efficient temperature moderating of the initial gas mixture, one preferred further development of the inventive solution provides for a heat exchanger system designed to transfer at least a portion of the thermal energy (heat loss) released in the gas separation system and/or compressor system during operation to the initial gas mixture.

Additionally or alternatively hereto, one further development of the inventive solution provides for the gas mixture provided at the outlet of the gas separation system and enriched with nitrogen to also be warmed by means of at least a portion of the thermal energy released in the gas separation system and/or compressor system during operation. It is hereto particularly conceivable for a further heat exchanger system to be provided. Warming the gas mixture provided at the outlet of the gas separation system and enriched with nitrogen prior to introducing it into the spatial atmosphere of the enclosed room is able to achieve a relatively quick dispersal of the nitrogen-enriched gas mixture within the spatial atmosphere of the enclosed room due to thermal convection such that a thoroughly homogenous drawdown level can be realized. It is in particular unnecessary for the nitrogen-enriched gas mixture to be introduced into the enclosed room at relatively high pressure in order to ensure thorough mixing within the spatial atmosphere. Introducing gas at high pressure is disadvantageous in terms of energy efficiency and can potentially be coupled with other disadvantages, particularly with respect to intended pressure relief.

So that a full inerting level can be set faster within the enclosed room when needed, one preferred realization of the inventive solution provides for a catalyst system in addition to the gas separation system. Said catalyst system is designed to produce an inert gas mixture through a chemical conversion of a reductant. It is hereby particularly conceivable for at least part of the gas mixture provided at the outlet of the gas separation system and enriched with nitrogen and/or a portion of the ambient air within the enclosed room to be supplied when needed to the catalyst system in order to produce an inert gas mixture in the catalyst system by means of chemical conversion of a reductant, said mixture then being introduced into the spatial atmosphere of the enclosed room.

In one preferred realization of the latter embodiment in which a catalyst system is used in addition to the gas separation system to produce inert gas when needed, a flammable substance, particularly a combustible gas, preferably carbon monoxide, is used as the reductant to be chemically converted in the catalyst system.

BRIEF DESCRIPTION OF THE DRAWINGS

The following will make reference to the accompanying drawings in describing various embodiments of the inventive solution.

Shown are.

DETAILED DESCRIPTION OF AN ILLUSTRATIVE EMBODIMENT

Figure 1:
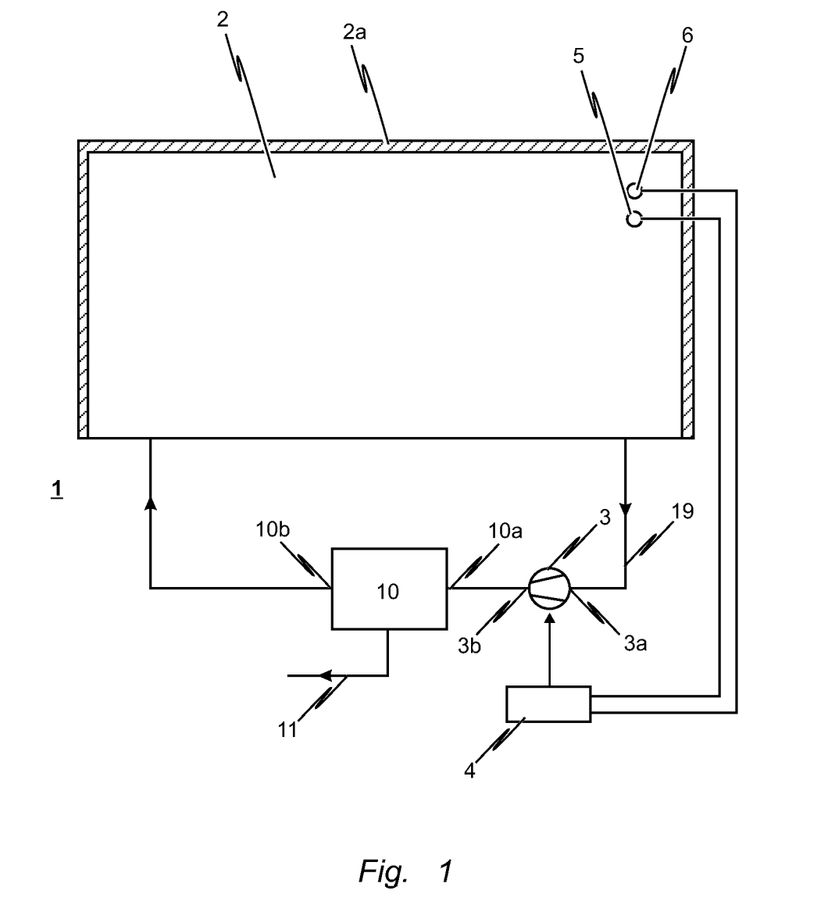
FIG. 1 a schematic view of a first exemplary embodiment of the inerting system according to the invention.

FIG. 1 shows a first exemplary embodiment of an inerting system 1 according to the present invention in a schematic depiction. The depicted inerting system 1 serves to set and maintain a predefinable drawdown level (inerting level) in the spatial atmosphere of an enclosed room 2. The enclosed room 2 can for example be a storage facility in which the oxygen content in the room's ambient air is lowered to and maintained at a specific (base) inerting level of e.g. 15% by volume, for example as a preventive fire protection measure.

The inerting system 1 in the embodiment depicted in FIG. 1 comprises a compressor system 3, its inlet 3a fluidly connected to the enclosed room 2 such that the compressor system 3 can be used to aspirate air from the interior of the enclosed room 2. The outlet 3b of the compressor system 3 is or can be fluidly connected to the inlet 10a of a gas separation system 10. By so doing, the compressor system 3 can aid in supplying the air previously discharged from the enclosed room 2 to the gas separation system 10 in compressed form.

However, it is of course also conceivable that the gas mixture supplied to the inlet 3a of the compressor system 3 is exclusively fresh air so that there is no need for a return line between the enclosed room 2 and the inlet 3a of the compressor system 3. Providing pressure relief in the enclosed room 2, for example in the form of one or more pressure relief flaps, is of particular advantage with this embodiment.

So that the internal pressure of enclosed room 2 does not change when air is purged from the room, the spatial shell 2a of the enclosed room 2 is preferably provided with ventilation openings (not depicted in FIG. 1). Same can hereby be naturally occurring leakages in the room's spatial shell 2a but also correspondingly positioned pressure relief vents.

The gas separation system 10 only depicted schematically in FIG. 1 serves to provide a nitrogen-enriched gas mixture at the outlet 10b of the gas separation system 10. In detail, the gas separation system 10 is designed to separate at least a portion of the oxygen content contained within the compressed initial gas mixture supplied from the compressor system 3. The oxygen separated from the initial gas mixture is dispensed to the external atmosphere via an exhaust line 11.

The nitrogen-enriched gas mixture provided at the outlet 10b of gas separation system 10 is thereafter introduced, preferably in regulated manner, into the spatial atmosphere of the enclosed room 2 such that a predefinable oxygen content which is reduced compared to the normal ambient air can be set and/or maintained in the spatial atmosphere of the enclosed room 2.

The correspondingly controllable components of the inerting system 1 are applicably controlled by the embodiment of a control unit 4 as schematically depicted in FIG. 1 such that a sufficient amount of the nitrogen-enriched gas mixture able to set or maintain the predefined drawdown level in enclosed room 2 is always available at outlet 10b of the gas separation system 10. To this end, an oxygen measuring device 5 is also provided to measure the prevailing oxygen content within the spatial atmosphere of the enclosed room 2 on a continuous basis or at predefined times or upon the occurrence of predefined events. The respective measurement readings are fed to the control unit 4 and compared there to corresponding target values. If the oxygen concentration in the room's atmosphere as determined by means of the oxygen measuring device 5 exceeds the target value stored in the control unit 4, the control unit 4 switches the compressor system 3 on, preferably automatically, and even more preferably, selectively automatically, in order to produce the compressed initial gas mixture. In so doing, the nitrogen-enriched gas is made available at the outlet 10b of the gas separation system 10 so that the oxygen content in the room's spatial atmosphere can be accordingly lowered further when the nitrogen-enriched gas mixture provided at the outlet 10b of gas separation system 10 is introduced into the room's atmosphere.

However, when the measured oxygen concentration versus target value comparison performed by the control unit 4 results in a value which has already fallen short of the target value, the control unit 4 switches the compressor system off so that no further nitrogen-enriched gas is provided at outlet 10b of the gas separation system 10. During the normal operation of the inerting system 1; i.e. when a base inerting level is to be set or maintained respectively in the enclosed room 2, the gas separation system 10 is supplied the initial gas mixture at an atmospheric pressure of for example 1.5 to 2.0 bar. This relatively low inlet pressure is produced by means of the compressor system 3.

As FIG. 1 shows, the inventive inerting system 1 is further equipped with a preferably aspirative fire detection system comprising at least one fire characteristic sensor 6. This fire characteristic sensor 6 is connected to the control unit 4 in the depicted embodiment via a control line. The fire detection system checks whether a fire has broken out in the enclosed room 2 either continuously or at predefined times or upon predefined events. When the fire characteristic sensor 6 detects a fire characteristic, it emits a corresponding signal to the control unit 4. The control unit 4 thereafter preferably automatically initiates the full inertization of the enclosed room 2, whereby the oxygen content in the spatial atmosphere of enclosed room 2 is lowered to a full inerting level, dependent on the fire load of room 2, of for example 12% by volume within the shortest possible time and according to a predetermined inerting curve.

The inventive solution is characterized by the inerting system 1 only employing a single inert gas source (here: separation system 10 with upstream compressor system 3), wherein the capacity of the gas separation system 10 can be correspondingly increased when needed so as to be able to provide the amount of nitrogen-enriched air needed for full inertization at the outlet 10b of gas separation system 10 as quickly as possible.

As will be described in greater detail below with reference to the depictions provided in FIGS. 2 to 4, the gas separation system 10 is preferably a single-bed nitrogen generator (see FIG. 4) or a dual-bed nitrogen generator (see FIGS. 2 and 3), whereby these generators can be selectively operated in PSA mode or in VPSA mode. In PSA operating mode, an initial gas mixture compressed to e.g. 7.0 to 9.0 bar is supplied to the gas separation system, in consequence of which the amount of nitrogen-enriched gas which can be provided at the outlet 10b of the gas separation system 10 per unit of time is clearly higher when compared to the VPSA operating mode. In VPSA operating mode, the degree of compression to the initial gas mixture is only at e.g. 1.5 to 2.0 bar.

Figure 2:
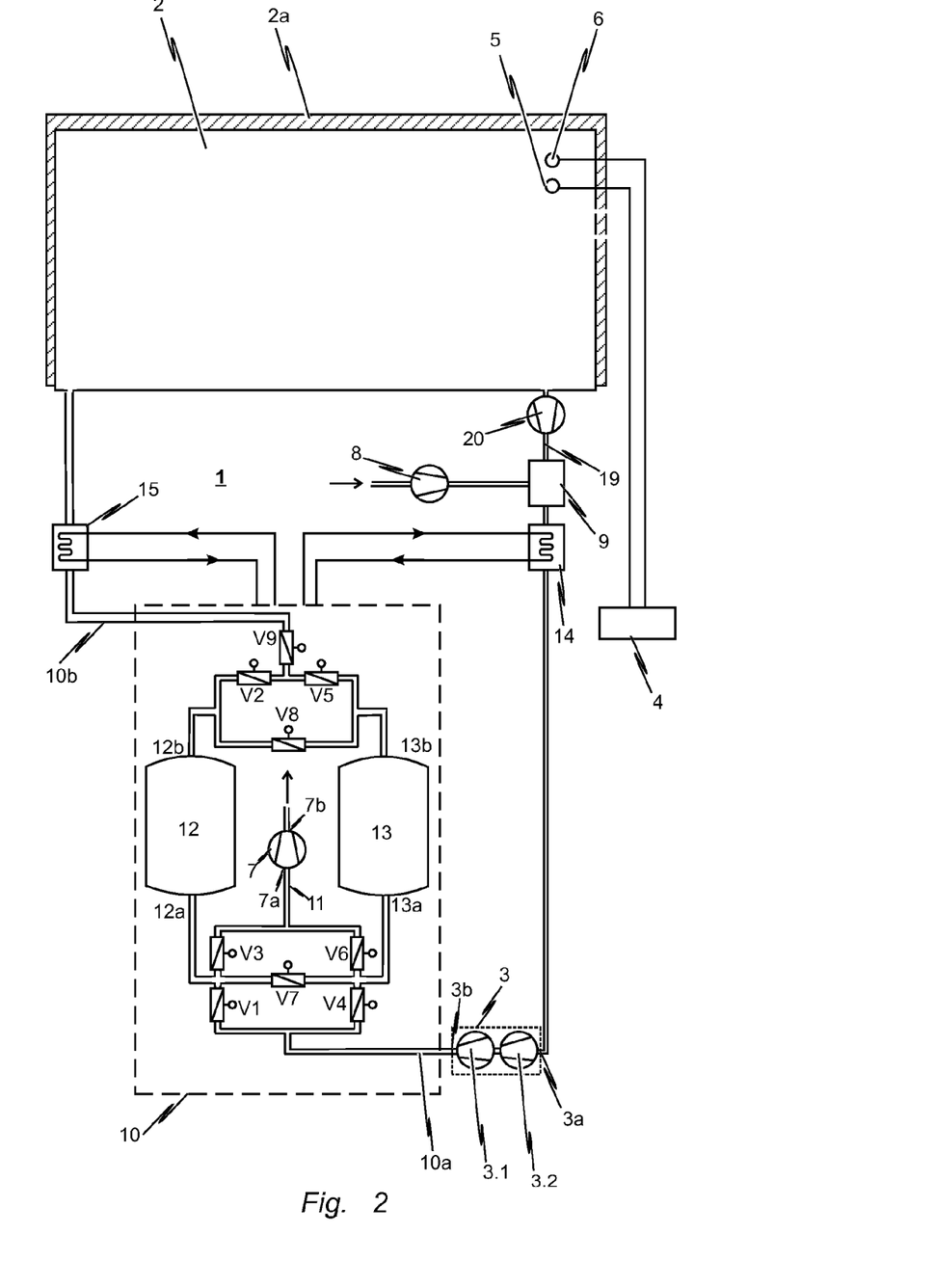
FIG. 2 a schematic view of a second exemplary embodiment of the inerting system according to the invention.

FIG. 2 schematically shows one exemplary embodiment of an inventive inerting system 1 in which a dual-bed nitrogen generator is used as gas separation system 10. The dual-bed system is characterized by the provision of a first and a second adsorber vessel 12, 13, each having an adsorbent bed or adsorber material respectively. When the initial gas mixture is routed through the adsorber material of the adsorber vessels 12, 13, the adsorber material adsorbs at least part of the oxygen contained within the initial gas mixture so that a nitrogen-enriched gas mixture is made available at the outlet 12b, 13b of the respective adsorber vessel 12, 13.

In the dual-bed system according to the exemplary embodiment depicted in FIG. 2, the two adsorber vessels 12, 13 are arranged parallel to each other such that they can be operated in phase opposition. In-phase opposition operation means that one of the two adsorber vessels 12, 13 is in one adsorption phase in which the adsorber material of the respective adsorber vessel 12, 13 adsorbs at least part of the oxygen from the initial gas mixture supplied. The other of the two adsorber vessels 13, 12 is thereby in a regeneration phase, during which the adsorber material of said other adsorber vessel 13, 12 is regenerated. Due to the consecutively alternating process steps, one of the two adsorber vessels is always adsorbing oxygen while the other is purged by desorption. Nitrogen-enriched gas at virtually constant pressure and of virtually constant purity is thereby continuously made available at the outlet 10b of the gas separation system 10.

In detail, and as can be seen from the pneumatics according to FIG. 2, the inlet 12a of the first adsorber vessel 12 can be connected to the pressure-side outlet 3b of the compressor system 3 by means of valve V1, while the outlet 12b of the first adsorber vessel 12 can be connected to the outlet 10b of the gas separation system 10 by means of valve V2. In like fashion, the inlet 13a of the second adsorber vessel 13 can be connected to the pressure-side outlet 3b of the compressor system 3 by means of valve V4 and the outlet 13b of the second adsorber vessel 13 to the outlet 10b of the gas separation system by means of valve V5.

Furthermore, the inlet 12a of the first adsorber vessel 12 can be connected via valve V3 and the inlet 13a of the second adsorber vessel 13 can be connected via valve V6 to the suction-side inlet 7a of a vacuum source 7.

In order to be able to vary the degree of the initial gas mixture compression achievable in the compressor system 3, it is conceivable to use a frequency-controlled compressor as compressor system 3. In the embodiment depicted in FIG. 2, however, the compressor system 3 consists of a plurality (here two) of individual compressors 3.1, 3.2 connected in series. When both compressors 3.1, 3.2 are switched on, the initial gas mixture is provided at the outlet 3b of the compressor system 3 in a highly compressed state, whereas when only one of the two compressors 3.1, 3.2 is switched on, the degree of the initial gas mixture compression is correspondingly reduced. However, it is of course also conceivable to employ a plurality of individual compressors which are not connected in series, whereby connecting additional compressors can increase the degree of compression.

An additional blower 20 is moreover positioned in the return line 19 between the enclosed room 2 and the inlet 3a of the compressor system 3 in the embodiment depicted in FIG. 2.

In the VPSA operating mode of the gas separation system 10 according to the embodiment of the inventive inerting system 1 depicted in FIG. 2, one of the two adsorber vessels 12, 13 is operated in an adsorption cycle while the other of the two adsorber vessels 13, 12 is concurrently operated in a vacuum cycle so as to be able to achieve a regeneration of the respective adsorber material. Valve V1 is open during the adsorption cycle of the first adsorber vessel 12 so that the pressure-side outlet 3b of the compressor system 3 is fluidly connected to the inlet 12a of said first adsorber vessel 12. The compressed initial gas mixture in compressor system 3 is thus supplied to the first adsorber vessel 12. The valve V2 provided at the outlet 12b of the first adsorber vessel 12 is open during the adsorption cycle of the first adsorber vessel 12 so that a nitrogen-enriched gas mixture is provided at the outlet 12b of said first adsorber vessel 12.

When the second adsorber vessel 13 is in vacuum cycle operation, the valve V5 provided at the outlet 13b of the second adsorber vessel 13 is closed. The valve V4 provided at the inlet 13a of the second adsorber vessel 13 is likewise closed so that the second adsorber vessel 13 is not fluidly connected to the pressure-side outlet 13b of the compressor system 3. However, the valve V6 provided at the inlet 13a of the second adsorber vessel 13 is open and the valve V3 provided at the inlet 12a of the first adsorber vessel 12 as well as the valve V4 provided at the inlet 13a of the second adsorber vessel 13 are closed.

By so doing, the inlet 13a of the second adsorber vessel 13 is fluidly connected to the suction-side inlet 7a of the vacuum source 7 so that at least part of the oxygen adsorbed by the adsorber material accommodated in the second adsorber vessel 13 is desorbed and purged from the second adsorber vessel by means of vacuum source 7 and released to the ambient air via outlet 7b of vacuum source 7.

After regeneration of the adsorber material of the second adsorber vessel 13, the second adsorber vessel 13 is operated in an adsorption cycle while the first adsorber vessel 12 is switched to desorption cycle. Valves V1, V2 and V6 are hereby closed and valves V3, V4 and V5 hereby opened for this purpose. The initial gas mixture compressed in compressor system 3 then passes through the adsorber material of the second adsorber vessel 13, in consequence of which a nitrogen-enriched gas is provided at the outlet 13b of said second adsorber vessel 13. On the other hand, at least part of the oxygen previously adsorbed in the first adsorber vessel is aspirated by vacuum source 7 and released to the external air such that regeneration of the adsorber material of the first adsorber vessel 12 occurs.

It is particularly advantageous for the inlet 12a of the first adsorber vessel 12 to be fluidly connected directly to the inlet 13a of the second adsorber vessel 13 via valve V7 and the outlet 12b of the first adsorber vessel 12 to the outlet 13b of the second adsorber vessel 13 via valve V8. Providing said valves V7, V8 particularly enables briefly (preferably 0.5 to 2 seconds) coupling the respective inlets 12a, 13a, and simultaneously the respective outlets 12b, 13b of the two adsorber vessels 12, 13 prior to switching between the adsorption phase and the regene-ration phase. Doing so allows equalizing the pressure between the two adsorber vessels 12, 13 such that the oxygen adsorption in the adsorption-phase adsorber vessel and the regenerating of the adsorber material of the regeneration-phase adsorber vessel 13, 12 can start immediately after switching between adsorption phase and regeneration phase. This measure optimizes the efficiency of the separation system 10.

The individual controllable components of the inerting system 1 according to FIG. 2 are correspondingly controllable by control unit 4. In particular, these are valves V1 to V9, compressor system 3, vacuum source 7 and blower 20.

When it becomes necessary in the event of a fire or for another reason to briefly reduce the oxygen content in the spatial atmosphere of enclosed room 2 further compared to a previously set or maintained reduced oxygen content, a greater amount of nitrogen-enriched gas needs to be made available per unit of time at the outlet 10b of the gas separation system 10.

In order to be able to realize this with the gas separation system 10 according to the FIG. 2 depiction, the control unit 4 directs the compressor system 3 to increase the degree of compression of the initial gas mixture. To be hereby taken into account is that the initial gas mixture was previously compressed to an atmospheric positive pressure of e.g. 1.5 to 2.0 bar in the above-described VPSA operating mode. The vacuum source 7 produces a negative pressure of e.g. 0.2 to 0.85 bar compared to the atmosphere. Increasing the degree of compression of the compressor system 3 to an atmospheric positive pressure of e.g. 7.0 to 9.0 bar increases the amount of gas routed through the adsorber vessels 12, 13 per unit of time, in consequence of which a considerably higher amount of nitrogen-enriched gas is also provided at the outlet 10b of the gas separation system 10 per unit of time.

In the PSA operating mode, in which compressor system 3 compresses the initial gas mixture to the cited example of 7.0 to 9.0 bar compared to the atmosphere, it is in principle also possible to alternatingly operate the two adsorber vessels 12, 13 in adsorption and regeneration mode. When the first adsorber vessel 12 is operated in adsorption cycle during the PSA operating mode, valves V1 and V2 are open and valve V3 closed. The initial gas mixture compressed to the high atmospheric positive pressure then passes through the adsorber material of the first adsorber vessel 12 such that a correspondingly high amount of nitrogen-enriched gas is provided at outlet 12b of the first adsorber vessel 12 per unit of time.

In the desorption cycle of the second adsorber vessel, valves V4 and V5 are closed and valve V6 open. Vacuum source 7 is moreover switched off such that the oxygen previously bound in the adsorber material will be released and will travel through the inlet 13a of the second adsorber vessel 13 and through-connected valve V6 to inlet 7b of vacuum source 7 where it is released to the external atmosphere.

The embodiment of the inventive inerting system 1 depicted in FIG. 2 provides for the initial gas mixture to be provided on the suction-side inlet 3a of the compressor system 3 by means of a portion of the ambient air contained within the enclosed room 2 being extracted from the room 2 in regulated manner and fresh air added to said supplied portion of the room's ambient air in regulated manner.

A fresh air blower 8 is provided for this purpose, its output able to be adjusted by the control unit 4. The fresh air blower 8 enables fresh air to enter into a mixing chamber 9 in which the fresh air is mixed with the room air. The initial gas mixture thus produced is aspirated out of said mixing chamber 9 by means of the compressor system 3.

The control unit 4 aids in selecting the amount of fresh air to be added to the air extracted from the room 2 such that the amount of ambient air extracted from the room 2 per unit of time is identical to the amount of nitrogen-enriched gas mixture introduced into the spatial atmosphere of the room 2.

The FIG. 2 embodiment of the inventive inerting system 1 makes use of a first heat exchanger system 14 to transfer at least a portion of the thermal energy released in the gas separation system 10 and/or the compressor system 3 during operation to the initial gas mixture. Specifically, the first heat exchanger system 14 is designed and dimensioned so that the temperature of the initial gas mixture can be moderated to a temperature of 10° C. to 30° C. and more preferentially to 15° C. to 25° C. At these temperatures, the adsorber material of the gas separation system 10 functions most effectively.

The embodiment of the inventive inerting system 1 depicted in FIG. 2 makes further use of a second heat exchanger system 15 which serves to transfer at least a portion of the thermal energy released in the gas separation system 10 and/or the compressor system 3 to the gas mixture enriched with nitrogen and provided at the outlet 10b of the gas separation system 10. Because a preheated and nitrogen-enriched gas mixture is thereby introduced into the enclosed room 2, the advantageous end result is that said gas mixture as supplied and enriched with nitrogen mixes thoroughly and quickly due to the natural convection within the enclosed room 2. In particular, moderating the temperature of the gas mixture to be supplied enables dispensing with pressurized introduction.

The inerting system 1 depicted in FIG. 3 corresponds substantially to the system described with reference to the FIG. 2 representation, although with a first catalyst system 16 being employed additionally to gas separation system 10. The first catalyst system 16 serves to produce the nitrogen-enriched gas mixture provided at the outlet 10b of the gas separation system 10 when needed by way of chemically converting a reductant of an inert gas mixture. In detail, the chemical conversion in the catalyzer converts a reductant, in particular a flammable substance such as for instance carbon monoxide, of the nitrogen-enriched gas mixture provided at the outlet 10b of the separation system 10 into an in inert gas mixture.

Figure 3:
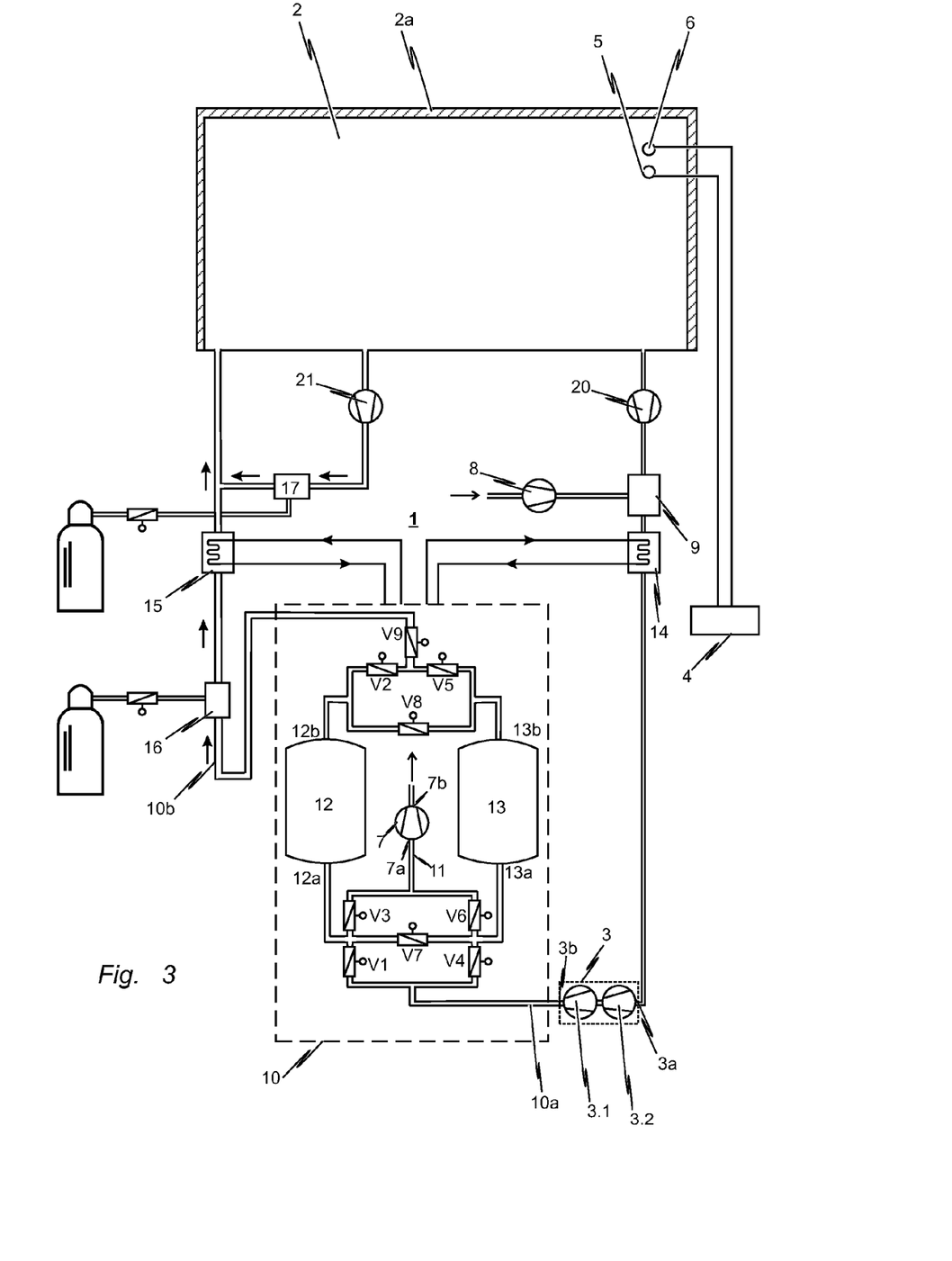
FIG. 3 a schematic view of a third exemplary embodiment of the inerting system according to the invention.

A second catalyst system 17 is likewise provided in the embodiment of the inerting system 1 depicted in FIG. 3. In contrast to the first catalyst system 16, the second catalyst system 17 is directly fed a portion of the ambient air contained within the enclosed room 2, wherein an additional blower 21 controllable by the control unit 4 is positioned between the enclosed room 2 and the catalyst system 17. A chemical conversion of a reductant, in particular carbon monoxide, in the catalyst system 17 produces an inert gas mixture which is thereafter introduced into the spatial atmosphere of the enclosed room 2.

The respective catalyst systems 16, 17 are switched on whenever the amount of nitrogen-enriched gas which the gas separation system 10 is able to provide per unit of time is insufficient to set and/or maintain a specific drawdown level in the spatial atmosphere of the enclosed room 2.

Figure 4:
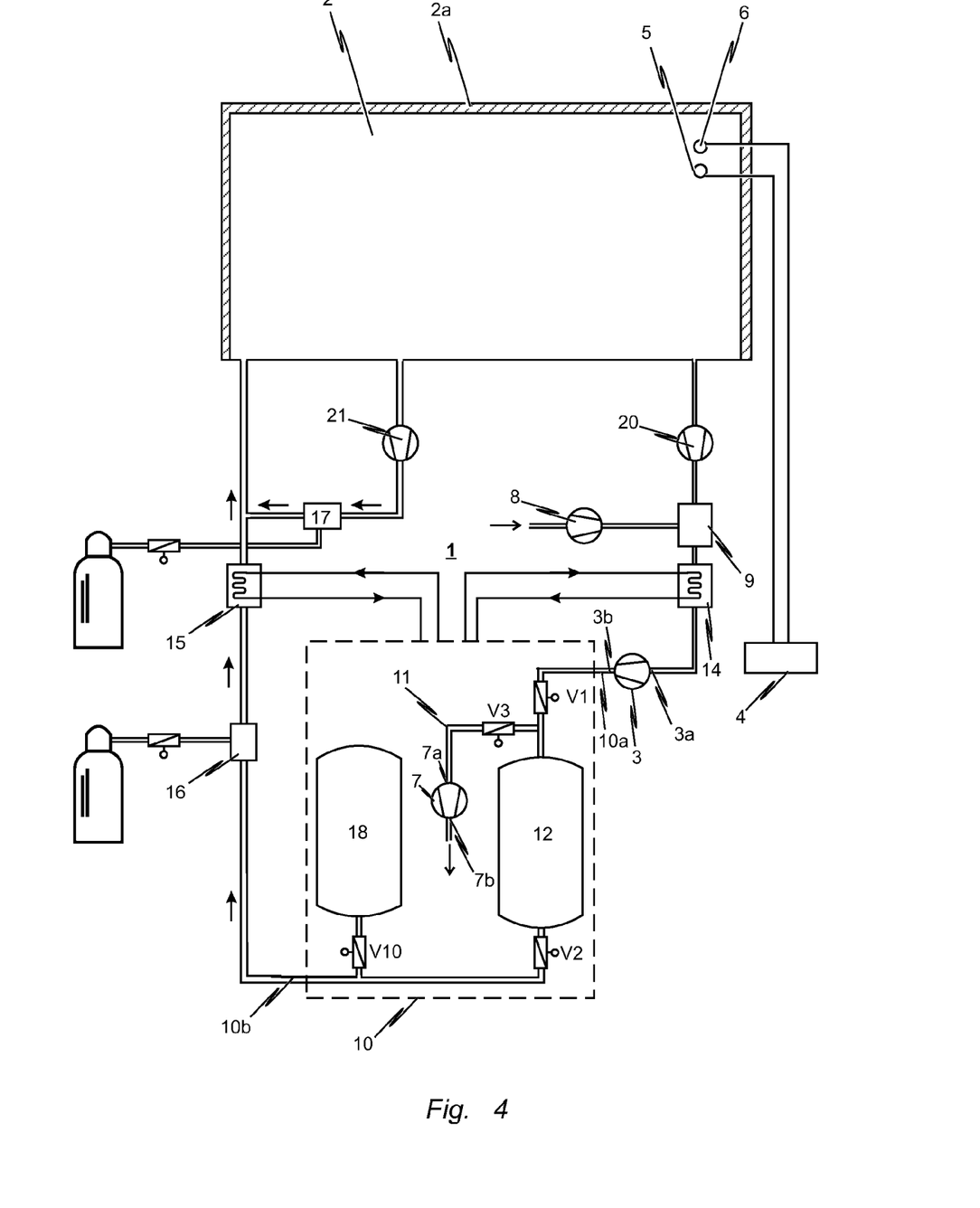
FIG. 4 a schematic view of a fourth exemplary embodiment of the inerting system according to the invention.

The inerting system 1 depicted in FIG. 4 substantially corresponds to the system described above with reference to the FIG. 3 representation, however with just a single-bed system being employed as the gas separation system 10. In other words, the gas separation system 10 of the inerting system 1 according to FIG. 4 comprises just one adsorber vessel 12 which can be connected on the inlet-side to the pressure-side outlet 3b of the compressor system 3 by means of valve V1. The outlet of the adsorber vessel 12 can be connected to the outlet 10b of the gas separation system 10 by means of valve V2. A valve V3 is furthermore provided at the inlet 12a of the adsorber vessel 12 in order to connect the inlet 12a of the adsorber vessel 12 to the suction side of a vacuum source 7 when needed.

As is also the case with the inerting systems 1 described above with reference to the representations according to FIGS. 2 and 3, the embodiment of the gas separation system 10 depicted in FIG. 4 can be operated in an adsorption cycle and in a regeneration/vacuum cycle. In the adsorption cycle, valve V1 and V2 are thereby open and valve V3 closed. When regenerating the adsorber material, valves V2 and V1 are closed whereas valve V3 is open. The vacuum source 7 is then used to remove the oxygen previously adsorbed in the adsorber material.

So as to increase the output capacity of the gas separation system 10, the control unit 4 is used to increase the degree of compression afforded by the compressor system 3 depicted in the embodiment of FIG. 4, for example from an original 1.5-2.0 bar to 7.0-9.0 bar positive atmospheric pressure.

In order to enable a continuous supply of nitrogen-enriched gas with the single-bed system according to FIG. 4, a low-pressure surge tank 18 is provided which can be connected when needed to the outlet 12b of the adsorber vessel 12 by means of valve V9 in order for the low-pressure surge tank 18 to be filled with the nitrogen-enriched gas. When so required, the low-pressure surge tank 18 can supply said nitrogen-enriched gas to room 2 via valve V9, which would be necessary for example when the adsorber vessel 12 is in the regeneration cycle or when the amount of nitrogen-enriched gas to be introduced into the atmosphere of the enclosed room 2 per unit of time needs to be rapidly increased.

Figure 5:
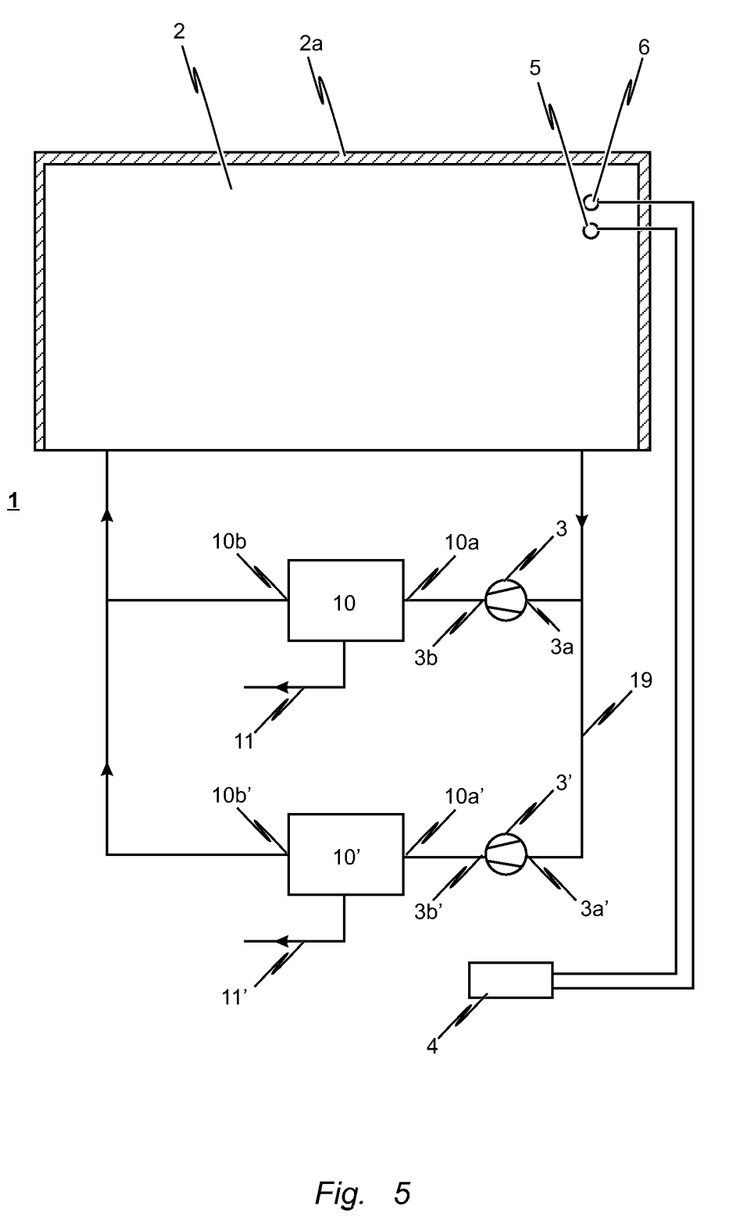
FIG. 5 a schematic view of a further exemplary embodiment of the inerting system according to the invention.

The following will make reference to the schematic depiction provided in FIG. 5 in describing a further exemplary embodiment of the inventive inerting system 1.

In accordance with this further embodiment of the present invention, it is provided for the enclosed room 2 to be equipped with a first gas separation system 10 and at least one further gas separation system 10', whereby these two gas separation systems 10, 10' are in each case configured like the gas separation systems 10 as used in the embodiments according to the depictions provided in FIGS. 1 to 4. In particular, the two gas separation systems 10, 10' each serve to provide a nitrogen-enriched gas mixture at the corresponding outlet 10b, 10b' of the respective gas separation system 10, 10'.

In the embodiment according to FIG. 5, each of the two gas separation systems 10, 10' has its own compressor system 3, 3', wherein these two compressor systems 3, 3' are independently controllable. Each compressor system 3, 3' serves to supply its associated gas separation system 10, 10' with a compressed initial gas mixture. The respective gas separation system 10, 10' then separates at least a portion of the oxygen contained within the initial gas mixture as supplied. The oxygen separated from the initial gas mixture is then released to the external atmosphere through the corresponding exhaust lines 11, 11'.

The nitrogen-enriched gas mixture provided at the respective outlet 10b, 10b' of the gas separation systems 10, 10' is then fed, preferably in regulated manner, into the spatial atmosphere of the enclosed room 2, particularly so as to set and/or maintain a predefinable oxygen content, and one which is reduced com-pared to the normal ambient air, in the spatial atmosphere of the enclosed room.

As FIG. 5 shows, gas separation system 10 and the at least one further gas separation system 10' are connected in parallel, wherein the respective outlet 10b, 10b' is fluidly connected or connectable to the enclosed room 2. The gas separation systems 10, 10' employed in the embodiment schematically depicted in FIG. 5 are each designed to be alternatively operated in VPSA mode or PSA mode.

A control unit 4 is also provided in the embodiment of the inventive solution depicted schematically in FIG. 5, same being designed to control at least one gas separation system 10, 10' associated with the gas separation systems 10, 10' of the enclosed room 2 such that the operating mode of the respective gas separa-tion system 10, 10' switches from VPSA mode to PSA mode as needed. This occurs particularly when an insufficiently homogeneous mixing is determined in the spatial atmosphere of the enclosed room 2.

In other words, when a respective sensor device detects gas layering in the enclosed room or when it is respectively determined that the mixing of the spatial atmosphere within the enclosed room 2 lacks sufficient homogeneity, the control unit 4 triggers at least one of the two gas separation systems 10, 10' to switch to PSA mode. Because the respective gas separation system 10, 10' can provide a higher volume of nitrogen-enriched gas mixture at its respective outlet 10b, 10b' per unit of time in PSA mode, a more thorough mixing within the spatial atmosphere of the enclosed room 2 can thus be ensured.

The invention is not limited to the embodiments depicted in the drawings but rather yields from an integrated consideration of all the features disclosed herein.

It is in particular conceivable for the system to be allocated a plurality of preferably independently operable gas separation systems. The control unit 4 of this further development is preferably designed such that when one of the gas separation systems fails or when one of the gas separation systems is unable to provide a nitrogen-enriched gas mixture for some other reason or the amount of nitrogen-enriched gas mixture able to be supplied by one of the gas separation systems per unit of time is below a design value for said gas separation system, it will switch at least one of the remaining gas separation systems 10 from VPSA mode into PSA mode. This switching from VPSA mode to PSA mode preferably occurs automatically as soon as it is determined that the volume of the nitrogen-enriched gas mixture able to be supplied per unit of time by one of the gas separation systems is below a design value for said gas separation system.

LIST OF REFERENCE NUMERALS 1 inerting system
2 enclosed room
2a spatial shell
3, 3' compressor system
3a, 3a' compressor system inlet
3b, 3b' compressor system outlet
4 control unit 5 oxygen measuring device
6 fire characteristic sensor
7 vacuum source
7a vacuum source inlet
7b vacuum source outlet
8 fresh air blower
9 mixing chamber
10, 10' gas separation system
10a, 10a' gas separation system inlet
10b, 10b' gas separation system outlet
11, 11' exhaust line
12 first adsorber vessel
12a first adsorber vessel inlet
12b first adsorber vessel outlet
13 second adsorber vessel
13a second adsorber vessel inlet
13b second adsorber vessel outlet
14 first heat exchanger system
15 second heat exchanger system
16 first catalyst system
17 second catalyst system
18 low-pressure surge tank
19 return line
20 blower
21 blower
V1 to V9 valves

What is claimed is:

1. Inerting method in which an oxygen content which is predefinable and reduced in comparison to normal ambient air is set and maintained in the spatial atmosphere of an enclosed room, wherein the method comprises the following procedural steps:
   i) providing an initial gas mixture of oxygen, nitrogen and further elements as applicable;
   ii) compressing the initial gas mixture provided in a compressor system;
   iii) feeding the compressed initial gas mixture to a gas separation system and separating at least a portion of the oxygen contained in the compressed initial gas mixture so as to provide a nitrogen-enriched gas mixture at the outlet of the gas separation system; and
   iv) introducing at least part of the nitrogen-enriched gas mixture provided at the outlet of the gas separation system into the spatial atmosphere of the enclosed room so as to set and/or maintain an oxygen content in the spatial atmosphere of the enclosed room which is predefinable and reduced in comparison to normal ambient air,
   wherein when an amount of nitrogen-enriched gas mixture provided per unit of time at the outlet of the gas separation system needs to be increased, the degree of compression realized in method step ii) is increased, particularly to a value dependent on the amount of nitrogen-enriched gas mixture to be provided per unit of time, wherein to supply the initial gas mixture in method step i), a portion of the ambient air within the enclosed room is extracted from the room in regulated manner and fresh air is fed in regulated manner to the extracted portion of the room air,
   wherein an amount of fresh air to be added to the ambient air extracted from the room is selected such that the amount of ambient air extracted from the room per unit of time is identical to the amount of the nitrogen-enriched gas mixture introduced into the spatial atmosphere of the room in method step iv).

2. The inerting method according to claim 1,
   wherein the degree of compression realized in method step ii) is increased in the event of a fire or when the oxygen content in the spatial atmosphere of the enclosed room is to be quickly reduced further compared to the oxygen content set and/or maintained in method step iv) for another reason, or when the amount of nitrogen-enriched gas mixture to be provided per unit of time at the outlet of the gas separation system needs to be increased due to increased air exchange, or due to a loss of a further insert gas source allocated to the enclosed room, particularly a loss of a further gas separation system allocated to the enclosed room; and/or
   wherein the degree of compression realized in method step ii) is progressively increased when needed until the amount of nitrogen-enriched gas mixture provided at the outlet of the gas separation system per unit of time corresponds to the amount of nitrogen-enriched gas mixture to be supplied per unit of time; and/or
   wherein the compressor system is designed to compress the supplied initial gas mixture to different, predefined or predefinable pressure ranges in method step ii), wherein the initial gas mixture is compressed automatically, and even more, selectively automatically, to one of the predefined or predefinable pressure ranges in method step ii) as a function of the reason and/or the cause of the needed increase in the nitrogen-enriched gas mixture to be supplied per unit of time at the outlet of the gas separation system.

3. The inerting method according to claim 1,
   wherein the gas separation system includes at least one adsorber vessel containing adsorber material, wherein the compressor system is connectable to an inlet of the adsorber vessel so as to supply the compressed initial gas mixture to the adsorber vessel in an adsorption phase of said adsorber vessel such that the adsorber material adsorbs oxygen from the initial gas mixture and the nitrogen-enriched gas mixture is provided at an outlet of the adsorber vessel,
   wherein a vacuum source is selectively connectable to the inlet of the adsorber vessel or a compressed air source selectively connectable to the outlet of the adsorber vessel so as to purge at least part of the oxygen adsorbed by the adsorber material via the inlet of the adsorber vessel in a regeneration phase of the adsorber vessel and thus regenerate the adsorber material.

4. The inerting method according to claim 1,
   wherein the gas separation system includes a first adsorber vessel and a second adsorber vessel each including adsorber material, wherein the first adsorber vessel and the second adsorber vessel operate in phase opposition such that one adsorber vessel of the first adsorber vessel and the second adsorber vessel is in an adsorption phase during which the adsorber material of the one adsorber vessel adsorbs at least part of the oxygen from the initial gas mixture supplied in method step iii) while the other of the first adsorber vessel and the second adsorber vessel is in a regeneration phase during which oxygen is desorbed from the adsorber material of the other adsorber vessel, wherein it is particularly provided for the respective outlets and the respective inlets of the adsorber vessels to be briefly fluidly connectively coupled prior to switching between the adsorption phase and the regeneration phase.

5. Inerting method in which an oxygen content which is predefinable and reduced in comparison to normal ambient air is set and maintained in the spatial atmosphere of an enclosed room, wherein the method comprises the following procedural steps:

i) providing an initial gas mixture of oxygen, nitrogen and further elements as applicable;
ii) compressing the initial gas mixture provided in a compressor system;
iii) feeding the compressed initial gas mixture to a gas separation system and separating at least a portion of the oxygen contained in the compressed initial gas mixture so as to provide a nitrogen-enriched gas mixture at the outlet of the gas separation system; and
iv) introducing at least part of the nitrogen-enriched gas mixture provided at the outlet of the gas separation system into the spatial atmosphere of the enclosed room so as to set and/or maintain an oxygen content in the spatial atmosphere of the enclosed room which is predefinable and reduced in comparison to normal ambient air,
wherein when an amount of nitrogen-enriched gas mixture provided per unit of time at the outlet of the gas separation system needs to be increased, the degree of compression realized in method step ii) is increased, particularly to a value dependent on the amount of nitrogen-enriched gas mixture to be provided per unit of time, and
wherein the gas separation system is operated in a Pressure Swing Adsorption (PSA) mode when the amount of the nitrogen-enriched gas mixture to be supplied per unit of time at the outlet of the gas separation system needs to be increased, and wherein the gas separation system is otherwise operated in a Vacuum Pressure Swing Adsorption (VPSA) mode.

6. The inerting method according to claim 5, wherein the method further comprises the following method steps:
feeding a compressed initial gas mixture to a further gas separation system and separating at least a portion of the oxygen contained in the compressed initial gas mixture so as to provide the nitrogen-enriched gas mixture at the outlet of the further gas separation system; and
introducing at least part of the nitrogen-enriched mixture provided at the outlet of the further gas separation system into the spatial atmosphere of the enclosed room,
wherein the gas separation system is operated in the PSA mode when the further gas separation system fails or when for some other reason no nitrogen-enriched gas mixture can be provided at the outlet of the further gas separation system or the amount of the nitrogen-enriched gas mixture able to be supplied at the outlet of the further gas separation system per unit of time is below a design value for said further gas separation system, and wherein the gas separation system is otherwise operated in the VPSA mode, wherein the switching of the gas separation system from the VPSA mode to the PSA mode occurs automatically as soon as it is determined that the amount of the nitrogen-enriched gas mixture able to be supplied per unit of time at the outlet of the further gas separation system is below a design value for said further gas separation system.

7. Inerting method in which an oxygen content which is predefinable and reduced in comparison to normal ambient air is set and maintained in the spatial atmosphere of an enclosed room, wherein the method comprises the following procedural steps:
i) providing an initial gas mixture of oxygen, nitrogen and further elements as applicable;
ii) compressing the initial gas mixture provided in a compressor system;
iii) feeding the compressed initial gas mixture to a gas separation system and separating at least a portion of the oxygen contained in the compressed initial gas mixture so as to provide a nitrogen-enriched gas mixture at the outlet of the gas separation system; and
iv) introducing at least part of the nitrogen-enriched gas mixture provided at the outlet of the gas separation system into the spatial atmosphere of the enclosed room so as to set and/or maintain an oxygen content in the spatial atmosphere of the enclosed room which is predefinable and reduced in comparison to normal ambient air,
wherein when an amount of nitrogen-enriched gas mixture provided per unit of time at the outlet of the gas separation system needs to be increased, the degree of compression realized in method step ii) is increased, particularly to a value dependent on the amount of nitrogen-enriched gas mixture to be provided per unit of time,
wherein at least a portion of the thermal energy released in the gas separation system and/or in the compressor system is used to warm the initial gas mixture, preferably such that the initial gas mixture has a temperature of 10° C. to 30° C.; and/or
wherein at least a portion of the thermal energy released in the gas separation system and/or in the compressor system is used to warm the nitrogen-enriched gas mixture provided at the outlet of the gas separation system.

8. The inerting method according to claim 1,
wherein the compressor system includes a first compressor and at least one second compressor, wherein connecting the second compressor to the first compressor increases the degree of compression realized in method step ii).

9. Inerting method in which an oxygen content which is predefinable and reduced in comparison to normal ambient air is set and maintained in the spatial atmosphere of an enclosed room, wherein the method comprises the following procedural steps:
i) providing an initial gas mixture of oxygen, nitrogen and further elements as applicable;
ii) compressing the initial gas mixture provided in a compressor system;
iii) feeding the compressed initial gas mixture to a gas separation system and separating at least a portion of the oxygen contained in the compressed initial gas mixture so as to provide a nitrogen-enriched gas mixture at the outlet of the gas separation system; and
iv) introducing at least part of the nitrogen-enriched gas mixture provided at the outlet of the gas separation system into the spatial atmosphere of the enclosed room so as to set and/or maintain an oxygen content in the spatial atmosphere of the enclosed room which is predefinable and reduced in comparison to normal ambient air,
wherein when an amount of nitrogen-enriched gas mixture provided per unit of time at the outlet of the gas separation system needs to be increased, the degree of compression realized in method step ii) is increased, particularly to a value dependent on the amount of nitrogen-enriched gas mixture to be provided per unit of time,
wherein in the event the amount of the nitrogen-enriched gas mixture to be provided per unit of time needs to be increased, at least part of the gas mixture provided in method step iii) at the outlet of the gas separation system and enriched with nitrogen and/or a portion of the ambient air contained within the enclosed room is fed to a catalyzer in which an inert gas mixture is produced from the nitrogen-enriched mixture or respectively from the portion of supplied room air through a chemical conversion of a reductant, wherein the inert gas mixture produced in the catalyzer is thereafter introduced into the spatial atmosphere of the enclosed room, wherein the reductant is preferably a flammable substance, particularly a combustible gas.

10. A system in which an oxygen content which is predefinable and reduced in comparison to normal ambient air is set and maintained in the spatial atmosphere of an enclosed room, wherein the system includes a compressor system for compressing an initial gas mixture and a gas separation system connected to the compressor system in which at least part of the oxygen contained within the compressed initial gas mixture is separated, wherein the gas separation system is designed to be selectively operated in either a Vacuum Pressure Swing Adsorption (VPSA mode) or a Pressure Swing Adsorption (PSA) mode, wherein a control unit is preferably provided which is designed to selectively automatically switch the gas separation system from the VPSA mode to the PSA mode when an amount of the nitrogen-enriched gas mixture provided per unit of time at the outlet of the gas separation system needs to be increased, wherein the compression ratio of the compressor system is preferably adjustable such that the initial gas mixture can be selectively compressed in the compressor system to a first low pressure value or a second high pressure value, particularly to a pressure of 1.5 to 2.0 bar or 7.0 to 9.0 bar, and wherein the control unit is designed to selectively automatically actuate the compressor system such that the initial gas mixture is compressed to the second, high pressure value in said compressor system when the volume of the nitrogen-enriched gas mixture provided per unit of time needs to be increased, wherein the compressor system includes a first compressor and at least one second compressor independently controllable from said first compressor, wherein the first and the second compressor are designed such that the degree of compression is increased by connecting said second compressor.

11. The system according to claim 10,
wherein the system includes at least one further gas separation system to provide a nitrogen-enriched gas mixture, and wherein the control unit is designed to switch the gas separation system from VPSA mode into PSA mode when the further gas separation system fails or when for some other reason no nitrogen-enriched gas mixture can be provided by the further gas separation system or the amount of nitrogen-enriched gas mixture able to be supplied per unit of time by the further gas separation system is below a design value for said further gas separation system, wherein the switching from the VPSA mode to the PSA mode occurs automatically as soon as it is determined that the amount of the nitrogen-enriched gas mixture able to be supplied per unit of time by the further gas separation system is below a design value for said further gas separation system.

12. The system according to claim 10,
wherein the gas separation system (10) includes the following:
an inlet connected or connectable to an outlet of the compressor system for supplying the compressed initial gas mixture;
a first outlet connected or connectable to the enclosed room for supplying a nitrogen-enriched gas mixture into the spatial atmosphere of the enclosed room;
a second outlet for purging an oxygen-enriched gas mixture from the gas separation system; and
at least one first and one second adsorber vessel, each containing an adsorber material, wherein the first and the second adsorber vessel are respectively connectable to the inlet, the first outlet and/or the second outlet of the gas separation system independently of one another via a system of valves, and wherein the second outlet of the gas separation system is selectively connectable to the suction side of a vacuum source, wherein a control unit is provided which is designed to selectively automatically connect the second outlet of the gas separation system to the suction side of the vacuum source when the gas separation system is operating in the VPSA mode.

13. The system according to claim 10,
wherein a heat exchanger system is further provided to transfer at least a portion of the thermal energy released in the gas separation system and/or in the compressor system to the initial gas mixture in order to warm the initial gas mixture to a temperature of 10° C. to 30° C.; and/or wherein a heat exchanger system is further provided to transfer at least a portion of the thermal energy released in the gas separation system and/or in the compressor system to the nitrogen-enriched gas mixture provided at the outlet of the gas separation system; and/or wherein a catalyst system is further provided which is able to be supplied as needed with at least a portion of the nitrogen-enriched gas mixture provided at the outlet of the gas separation system and/or a portion of the ambient air of the enclosed room in order to produce an inert gas mixture through a chemical conversion of a reductant, wherein the outlet of the catalyst system is connected or connectable to the enclosed room so as to introduce the inert gas mixture produced in said catalyst system into the spatial atmosphere of the enclosed room.

14. The inerting method according to claim 5,
wherein the degree of compression realized in method step ii) is increased in the event of a fire or when the oxygen content in the spatial atmosphere of the enclosed room is to be quickly reduced further compared to the oxygen content set and/or maintained in method step iv) for another reason, or when the amount of nitrogen-enriched gas mixture to be provided per unit of time at the outlet of the gas separation system needs to be increased due to increased air exchange, or due to a loss of a further insert gas source allocated to the enclosed room, particularly a loss of a further gas separation system allocated to the enclosed room; and/or wherein the degree of compression realized in method step ii) is progressively increased when needed until the amount of nitrogen-enriched gas mixture provided at the outlet of the gas separation system per unit of time corresponds to the amount of nitrogen-enriched gas mixture to be supplied per unit of time; and/or wherein the compressor system is designed to compress the supplied initial gas mixture to different, predefined or predefinable pressure ranges in method step ii), wherein the initial gas mixture is compressed automatically, and even more, selectively automatically, to one of the predefined or predefinable pressure ranges in method step ii) as a function of the reason and/or the cause of the needed increase in the nitrogen-enriched gas mixture to be supplied per unit of time at the outlet of the gas separation system.

15. The inerting method according to claim 5,
wherein to supply the initial gas mixture in method step i), a portion of the ambient air within the enclosed room is extracted from the room in regulated manner and fresh air is fed in regulated manner to the extracted portion of the room air,
wherein the amount of fresh air to be added to the ambient air extracted from the room is selected such that the amount of ambient air extracted from the room per unit of time is identical to the amount of the nitrogen-enriched gas mixture introduced into the spatial atmosphere of the room in method step iv).

16. The inerting method according to claim 5,
wherein the gas separation system includes at least one adsorber vessel containing adsorber material, wherein the compressor system is connectable to an inlet of the adsorber vessel so as to supply the compressed initial gas mixture to the adsorber vessel in an adsorption phase of said adsorber vessel such that the adsorber material adsorbs oxygen from the initial gas mixture and the nitrogen-enriched gas mixture is provided at an outlet of the adsorber vessel,
wherein a vacuum source is selectively connectable to the inlet of the adsorber vessel or a compressed air source selectively connectable to the outlet of the adsorber vessel so as to purge at least part of the oxygen adsorbed by the adsorber material via the inlet of the adsorber vessel in a regeneration phase of the adsorber vessel and thus regenerate the adsorber material.

17. The inerting method according to claim 5,
wherein the gas separation system includes a first and a second adsorber vessel each including adsorber material, wherein the adsorber vessels operate in phase opposition such that one of the two adsorber vessels is in an adsorption phase during which the adsorber material of the adsorber vessel adsorbs at least part of the oxygen from the initial gas mixture supplied in method step iii) while the other of the two adsorber vessels is in a regeneration phase during which oxygen is desorbed from the adsorber material of the other adsorber vessel, wherein it is particularly provided for the respective outlets and the respective inlets of the adsorber vessels to be briefly fluidly connectively coupled prior to switching between the adsorption phase and the regeneration phase.

18. The inerting method according to claim 7,
wherein the degree of compression realized in method step ii) is increased in the event of a fire or when the oxygen content in the spatial atmosphere of the enclosed room is to be quickly reduced further compared to the oxygen content set and/or maintained in method step iv) for another reason, or when the amount of nitrogen-enriched gas mixture to be provided per unit of time at the outlet of the gas separation system needs to be increased due to increased air exchange, or due to a loss of a further insert gas source allocated to the enclosed room, particularly a loss of a further gas separation system allocated to the enclosed room; and/or
wherein the degree of compression realized in method step ii) is progressively increased when needed until the amount of nitrogen-enriched gas mixture provided at the outlet of the gas separation system per unit of time corresponds to the amount of nitrogen-enriched gas mixture to be supplied per unit of time; and/or
wherein the compressor system is designed to compress the supplied initial gas mixture to different, predefined or predefinable pressure ranges in method step ii), wherein the initial gas mixture is compressed automatically, and even more, selectively automatically, to one of the predefined or predefinable pressure ranges in method step ii) as a function of the reason and/or the cause of the needed increase in the nitrogen-enriched gas mixture to be supplied per unit of time at the outlet of the gas separation system.

19. The inerting method according to claim 7,
wherein to supply the initial gas mixture in method step i), a portion of the ambient air within the enclosed room is extracted from the room in regulated manner and fresh air is fed in regulated manner to the extracted portion of the room air,
wherein the amount of fresh air to be added to the ambient air extracted from the room is selected such that the amount of ambient air extracted from the room per unit of time is identical to the amount of the nitrogen-enriched gas mixture introduced into the spatial atmosphere of the room in method step iv).

20. The inerting method according to claim 7,
wherein the gas separation system includes at least one adsorber vessel containing adsorber material, wherein the compressor system is connectable to an inlet of the adsorber vessel so as to supply the compressed initial gas mixture to the adsorber vessel in an adsorption phase of said adsorber vessel such that the adsorber material adsorbs oxygen from the initial gas mixture and the nitrogen-enriched gas mixture is provided at an outlet of the adsorber vessel,
wherein a vacuum source is selectively connectable to the inlet of the adsorber vessel or a compressed air source selectively connectable to the outlet of the adsorber vessel so as to purge at least part of the oxygen adsorbed by the adsorber material via the inlet of the adsorber vessel in a regeneration phase of the adsorber vessel and thus regenerate the adsorber material.

* * * * *